United States Patent [19]
Noh

[11] Patent Number: 5,946,420
[45] Date of Patent: *Aug. 31, 1999

[54] PRINTING WITH TEXT ENHANCEMENT: RECOGNITION BY SENSING PAIRED EDGES, OR BY DISQUALIFICATION IN PICTORIAL REGIONS

[75] Inventor: Jae Jung Noh, San Diego, Calif.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/644,808

[22] Filed: May 10, 1996

[51] Int. Cl.$^6$ ............... G06K 9/40; H04N 1/40
[52] U.S. Cl. ............ 382/254; 382/266; 358/462; 358/532
[58] Field of Search ............... 382/254, 266, 382/260, 263; 358/462, 464, 448, 455, 530, 532

[56] References Cited

U.S. PATENT DOCUMENTS

| | | | |
|---|---|---|---|
| 5,296,939 | 3/1994 | Suzuki | 358/453 |
| 5,375,197 | 12/1994 | Kang | 395/147 |
| 5,392,365 | 2/1995 | Steinkirchner | 382/260 |
| 5,485,534 | 1/1996 | Takemoto et al. | 382/266 |
| 5,745,596 | 4/1998 | Jefferson | 382/176 |

FOREIGN PATENT DOCUMENTS

| | | | |
|---|---|---|---|
| 0 630 149 | 12/1994 | European Pat. Off. | H04N 1/40 |
| 0 741 487 | 11/1996 | European Pat. Off. | H04N 1/40 |

*Primary Examiner*—Thomas D. Lee
*Attorney, Agent, or Firm*—Jerry R. Potts

[57] ABSTRACT

Text is recognized in a scanned image, by sensing left and right edges, preferably in coincidence in all three color planes—or otherwise to determine edges in black. Such edge sensing is preferably done by convolution of the input pixel stream with a windowed vertical jump, yielding narrow peaks of opposite directedness at beginning and end of each character stroke. Textual material is indicated where such peaks alternate in directedness. Concurrent testing is desirable also for dark pixels between beginning and end of each stroke—and light pixels between end of one stroke and beginning of the next. In addition it is preferable to test for an appropriate (black and white) mix of pixels in each candidate text region. A preliminary test is conducted to determine whether a region being scanned is pictorial; in this case the entire edge-detection protocol with associated tests is bypassed, on the operating assumption that black-and-white text cannot be present in a region that is pictorial. The pictorial-region test consists of determining whether only very few light pixels are present.

23 Claims, 4 Drawing Sheets

PRINTING WITH TEXT ENHANCEMENT: RECOGNITION BY SENSING PAIRED EDGES, OR BY DISQUALIFICATION IN PICTORIAL REGIONS

FIELD OF THE INVENTION

This invention relates generally to machines and procedures for printing text or graphics on printing media such as paper, transparency stock, or other glossy media—in response to an image that has been read in by an image scanner; and more particularly to a color copier/printer/scanner, preferably operating on an inkjet principle, that constructs text or images from individual ink spots created on a printing medium, in a two-dimensional pixel array.

The invention employs novel systems and methods for recognizing and visually enhancing text within an image that is being read in for printing.

BACKGROUND OF THE INVENTION

Earlier workers have sought to provide devices or procedures for recognizing and enhancing text in an image that is being analyzed preparatory to printing. Earlier (but not prior-art) innovations, for example, have analyzed color images to locate regions having, or made up of, a "correct" mix of colors—namely, mostly white and black.

One such earlier innovation operates primarily by forming histograms of the numbers of pixels of different colors, in each region of the input image. Where histograms reflect high concentrations of black and white peaks in general coincidence, the presence of black text is automatically inferred and text-enhancement techniques accordingly applied.

Such a paradigm works reasonably well, but only at the cost of an extremely heavy computational burden. Great amounts of computation are necessary to reduce the likelihood of incorrectly identifying as "text" a region that happens to have mostly white and black pixels for some reason other than the actual presence of text.

As an example, if an optical reading scanner is used to acquire the input image—and if that image being acquired was previously printed using a printer with resolution very close to that of the scanner, the resulting acquired image may spuriously appear to have the "correct" (mostly black and white) pixel mix. This can occur if the very similar pixel grids in a particular region are misaligned by just about half the pixel periodicity.

When this happens, the scanner components sensitive to a particular color (for example red) may respond to the primarily white or light spaces between pixels—but on the assumption that they are pixels. The result is a peak in the histogram for white pixels.

Meanwhile the scanner components sensitive to another particular color (for example blue) may happen to be better aligned to the previously printed pixel grid—an offset of only $\frac{1}{50}$ cm ($\frac{1}{1200}$ inch) between the two sensor arrays can produce this condition—and will produce a peak in the histogram for dark pixels. Even though the latter are only dark and not black, the system must respond to the two peaks with a decision that the region contains text.

In any event, such earlier innovations, after "identifying" text regions whether correctly or incorrectly, then proceed to enhance those regions by "snapping" dark image elements (pixels) to pure black—in other words, for a three-color intensity specification, by adjusting or setting all three of the input color intensities to zeroes: "0, 0, 0".

In such earlier innovations, light-colored image elements in the text regions are not adjusted at all; and image elements intermediate between dark and light, in text regions of the image, are snapped to pure white. The actual enhancement thus produced is very satisfactory—but for the undesirably large amount of computation required preliminarily to identify the text regions, and the occasional errors described above.

Another undesirable characteristic of known earlier text-enhancement procedures and systems is that they use relatively large amounts of time to check for text, even in image regions which a human viewer can recognize instantly are entirely pictorial. Of course this is wasteful of computing time and thus throughput.

It is not intended to criticize those earlier innovations for as noted above they do perform excellently in nearly all respects, and in general produce superb results quickly and economically. Room for refinement, however, can be found.

SUMMARY OF THE DISCLOSURE

The present invention introduces such refinement. Before introduction of the invention with a certain degree of rigor, some informal introductory remarks may be helpful in understanding the invention.

Earlier workers have noticed that text in a color image is often best identified by the fact that it consists mostly of white and black pixels. That is not the only criterion. Another criterion is that text consists of alternating left-side and right-side edges—in particular relatively abrupt edges.

In particular, if text is in black, these edges will be seen in coincidence in all colors. Thus for example in a scanner that reads an image by resolving it into plural colors (most typically red, blue and green), at each side of a text element an edge will be found at precisely the same position in the respective data for each one of the plural colors.

Alternatively this may be expressed, in the loose jargon of color-printing engineers, by saying that text can be recognized as left edges followed by right edges in all planes. The psychophysical phenomenon of color is regarded as having three "dimensions"; thus each "plane" here means the data for one color dimension.

If a system or method depended on the above-described criterion exclusively, various nontextual image elements (such as pin-striped black clothing) would be confused with text. To avoid such confusion, another criterion can be used as a cross-check; in fact one sometimes-helpful additional criterion is the characteristic that was mentioned earlier in the "RELATED ART" section of this document—pixel mix, or presence of mostly white and black pixels.

Now, however, because the pixel mix is not to be used alone but rather as just one of two characteristics, a much smaller amount of computation suffices for this part of the identification. Consequently it is possible to very efficiently identify text by the further coincidence of (1) left and right edges in all colors with (2) mostly black and white pixels. (Even this dual criterion does not resolve the black-pinstripes problem, but this difficulty will be put to rest shortly.)

Also part of the invention is a particular way of implementing the recognition of left edges followed by right edges. This is accomplished by forming a convolution of each group of pixels (in the data for each color) with a test function.

The test function that works best includes a vertical jump, corresponding to the essential characteristic of an edge. (In this document the phrase "vertical jump" is used in place of the more common "step function" or "step"—to avoid confusion with the procedural "steps" of the method aspects of the invention.)

Other desirable features of the test function which is convolved with the pixel data include two other, subsidiary vertical jumps spaced to left and right from the main jump. These serve in effect as a sliding window to isolate, in turn, just a narrow region about each pixel under test.

Additional details of the convolution and the test function appear in a "DETAILED DESCRIPTION" function which follows. At this point, however, it is helpful to realize that the resulting convolution function consists of peaks or upward spikes followed by troughs or downward spikes.

A positive-going peak occurs at the left edge of a text element, where the underlying data are going from white to black (i. e., from zero to dark or unity in each color). A negative-going peak or trough occurs at the right edge of a text element, where the underlying data are going from black to white.

Consequently, coincidence of yet a third criterion can be superimposed on the first two mentioned above, for recognition of text: the region between each peak and its associated trough (considering the data sequence from left to right) should be black, since this is the interior of each textual character stroke or element. Conversely the region from trough to peak should be white.

In assessing the second criterion discussed above—that is, whether the pixel mix is correct (mostly black and white) —it is considered desirable to apply a varying threshold. If no text has been identified in many rows, then the threshold for the condition "mostly black and white pixels" should be quite high so that the criterion is applied rather strictly.

On the other hand if text has been identified in an immediately preceding row, or small number of rows, then the threshold should be quite low so that the criterion is applied liberally. For intermediate conditions a sliding scale of threshold values may be used—for example, a linear or other algebraic function; however, it is adequate for most printing environments to have at most just one intermediate threshold value. To evaluate these historical conditions a memory of less than one kilobyte suffices.

A still further cross-check for text is this: text, for enhancement purposes, is present only where a pictorial element is not present; in other words, pictorial and textual elements can be taken as mutually exclusive. A pictorial element may be detected or defined for this purpose as an image region where there are very few light pixels.

This additional criterion has some limitations, as will be explained later, but in general is very simple and effective. In particular it can be used to avoid the previously mentioned wastefulness of looking for text—by any recognition method—in cases for which a pictorial element can be recognized very easily. Furthermore this test does resolve the black-pinstripes problem discussed earlier.

Now with that introduction in mind, we proceed to a more formal statement of the invention. In its preferred embodiments, the present invention has aspects or facets that can be used independently, although they are preferably employed together to optimize their benefits.

In preferred embodiments of a first facet or aspect of its aspects, the invention is a method for enhancing and printing text in an image having multiple regions. The method includes the step of reading the image.

The method also includes the steps of analyzing the read image to find left and right edges; and identifying as "text" only certain regions of the image where left and right edges are found. The method also includes the steps of enhancing the image in the regions identified as text; and printing the enhanced image.

The foregoing may constitute a description or definition of the first facet of the invention in its broadest or most general form. Even in this general form, however, it can be seen that this aspect of the invention significantly mitigates the difficulties left unresolved in the art.

In particular, because left and right edges can be found very efficiently and quickly this method is far more rapid, and economical of processing time, than the method of recognizing pixel mix.

Although this aspect of the invention in its broad form thus represents a significant advance in the art, it is preferably practiced in conjunction with certain other features or characteristics that further enhance enjoyment of overall benefits.

For example, where the method is expressly for use with a color image it is preferred that the reading step include the substeps of first resolving the image into a plurality of colors, and searching each color of the image to detect left and right edges in that color. Here it is also preferred that the analyzing step include finding as left and right edges only regions where left and right edges are detected in plural colors.

In the preferred case just described, it is also preferred that the searching substep include the step of convolving each color of the image with a test function. The test function preferably includes a vertical jump.

The test function more preferably includes a vertical jump of a certain height, spaced between two other vertical jumps of lesser height and opposite direction to the first-mentioned vertical jump. Related preferences in this regard will appear shortly.

In the same preferred case it is also desirable that the method further include the step of analyzing the read image to locate regions having mostly white and black—and that the identifying step include identifying as "text" only (1) those located regions of the image having mostly white and black, in coincidence with (2) the found left and right edges mentioned earlier.

It is still further preferable, where the convolving step produces a convolution that has a peaks followed by troughs; that the method further include the step of analyzing the read image to select regions having primarily black between peak and trough, and primarily white between trough and peak. Here the identifying step includes identifying as "text" only (1) those selected regions having primarily black bwtween peak and trough, and primarily white between trough and peak, in coincidence with the previously mentioned (2) "found" left and right edges and (3) "located" mostly white and black regions.

Also preferred, for use where the analyzing step comprises resolving the image into a multiplicity of pixel rows, is use of a threshold arrangement for each pixel row after a first pixel row. The previously mentioned analyzing-to-locate step includes applying a threshold, for what constitutes mostly white and black, which is progressively higher when there are progressively greater numbers of pixel rows since the last preceding identified "text".

In this regard preferably the analyzing-to-locate step includes applying one of at least three thresholds for what constitutes mostly white and black:

a high threshold, if there has not been text in many preceding rows of the image;

a low threshold, if there has been text in immediately preceding rows of the image; and an intermediate threshold if there has been text in preceding rows of the image but not immediately preceding rows.

Another preference is to include the additional step of testing portions of the read image to determine whether each tested portion contains pictorial elements; then, if a particular tested portion contains pictorial elements, the analyzing and identifying steps can be discounted. Actually in such a case it is preferable to disregard those steps entirely, since disregarding them implies that they need not be performed, and in fact it is preferable to omit those steps for tested portions containing pictorial elements.

Preferably the pictorial-element testing step includes examining each portion to verify that it has very few light-colored pixels; and identifying a portion that does have very few such pixels as "a portion that contains pictorial elements".

In preferred embodiments of a second of its independent facets or aspects, the present invention is a method for enhancing and printing text in an image having multiple regions. The method includes the step of reading the image.

It also includes the step of testing portions of the read image to determine whether each tested portion contains pictorial elements. If a particular tested portion is found to lack pictorial elements, then the method also includes the steps of (1) analyzing the read image to find left and right edges, and (2) identifying as "text" only certain regions of the image where left and right edges are found.

If a particular tested portion contains pictorial elements, then the method includes the step of omitting or discounting the analyzing and identifying steps. The method also includes the steps of enhancing the image in the regions identified as text, and printing the enhanced image.

The foregoing may be a definition or description of the second aspect of the invention in its broadest or most general form. Even in this form, however, as will be seen this method is very advantageous in that it enables a very quick shortcut around even the relatively efficient and fast text-recognition procedures of the present invention.

Nevertheless it is preferred to practice this second aspect of the invention with certain characteristics or features that optimize enjoyment of the benefits of the invention. For example, although it is within the scope of the appended claims to merely "discount" the analyzing and identifying steps—i. e., to give them little weight in determining whether or not to apply text enhancement—preferably the analyzing and identifying steps are actually omitted since this provides the maximum advantage in processing time.

Also it is preferred that the testing step include the substeps of examining each portion to verify that it has very few light pixels, and identifying "a portion that contains pictorial elements" as a portion that has very few light pixels.

In a third of its independent aspects or facets, the invention is a system for enhancing and printing text in an image having multiple regions. The system includes some means for reading the image.

It also includes some means for analyzing the read image to find left and right edges, and some means for identifying as "text" only certain regions of the image where left and right edges are found. The system also includes some means for enhancing the image in the regions identified as text, and some means for printing the enhanced image.

The foregoing may constitute a description or definition of the third facet of the invention in its broadest or most general form. Even in this general form, however, it can be seen that this aspect of the invention too significantly mitigates the difficulties left unresolved in the art.

In particular, the advances achieved here are related to the speed and efficiency mentioned earlier in connection with the first aspect of the invention.

Although this third aspect of the invention in its broad form thus represents a significant advance in the art, it is preferably practiced in conjunction with certain other features or characteristics that further enhance enjoyment of overall benefits. Also applicable here are preferences, for optimization of the benefits of the invention, related to the preferences outlined above for the first aspect of the invention.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

A representative positive-going edge waveform 21 usually has rounded corners (FIG. 1) or angled sides. Nevertheless if its convolution is formed with a test function that is a square-cornered vertical jump 11, and that is aligned as shown with the jump 21, the convolution responds with a positive output value.

Figure 1:
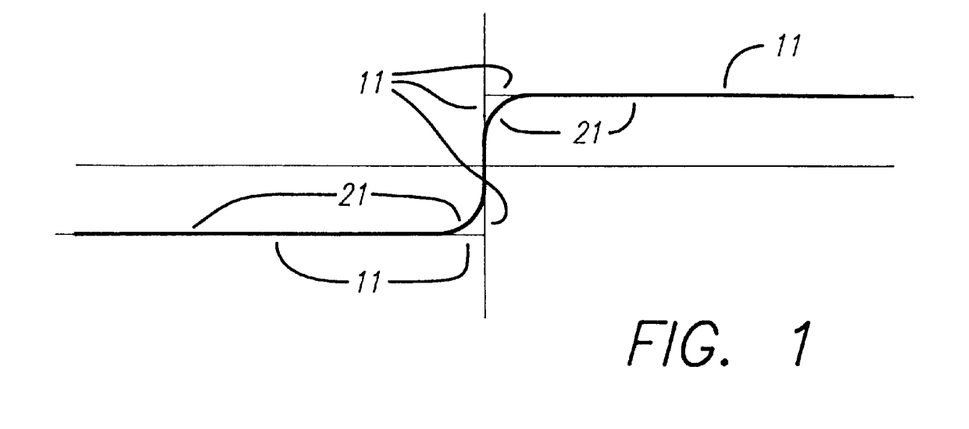
FIG. 1 is a conceptual diagram showing the basic vertical-jump (or "step") function that is used as a test function in the convolution process of preferred embodiments of the invention—and also showing superimposed a graph of a textual-element edge (color darkness vs. pixel position) in any representative color plane.

Such a response can be used, as will be detailed below, to find edges and thereby to recognize text elements. In the real world, however, a row of scanned-in image data typically has more than one feature 21, and it is necessary to isolate the effects of the different features 21 from one another.

This can be accomplished by using a slightly more sophisticated test function 31 (FIG. 2) that also incorporates a window—consisting of two other vertical jumps 32, each smaller than, and oppositely directed to, the central jump. The heights of the two smaller window-end jumps 32 typically add up to the height of the central jump, and the window-end jumps are spaced by some number of pixels C, preferably about three pixels as shown (but not necessarily symmetrically disposed), to left and right of the central jump.

Figure 2:
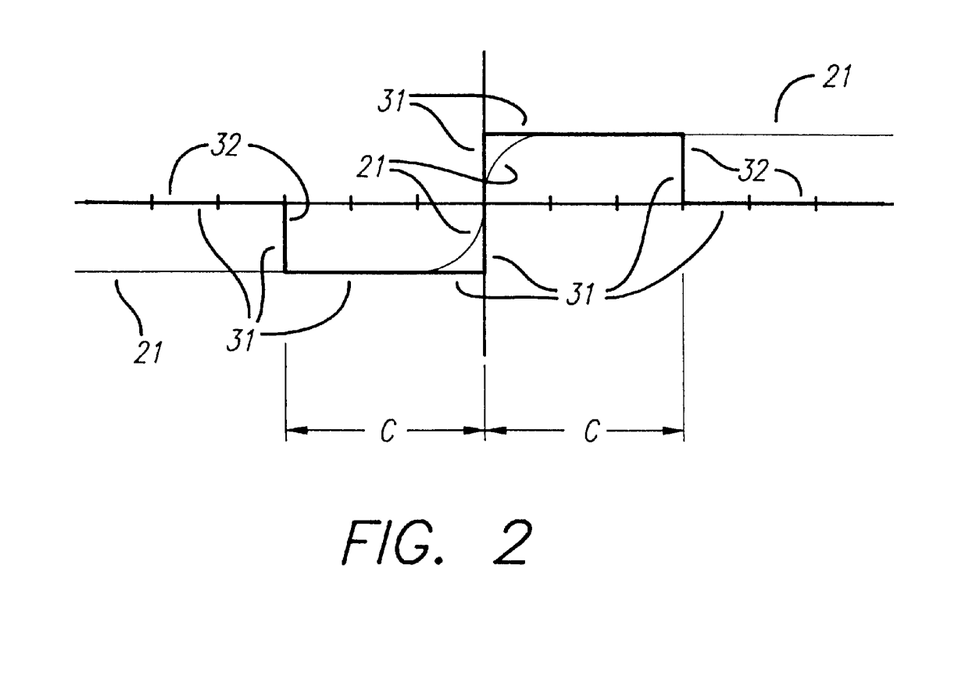
FIG. 2 is a like diagram showing the jump function in a more complete form —and also with the image edge superimposed.

As suggested above, a positive response occurs only if, as shown, the two waveforms 21, 31 are aligned. In practice the vertical jump 31 is stepped, pixel by pixel, along a row of input-image pixels 121 (FIG. 3)—and as the convolution approaches 122 (and leaves 124) a pixel t1 where there is alignment with an edge 123, the convolution ideally responds only with zero output 128.

Figure 3:
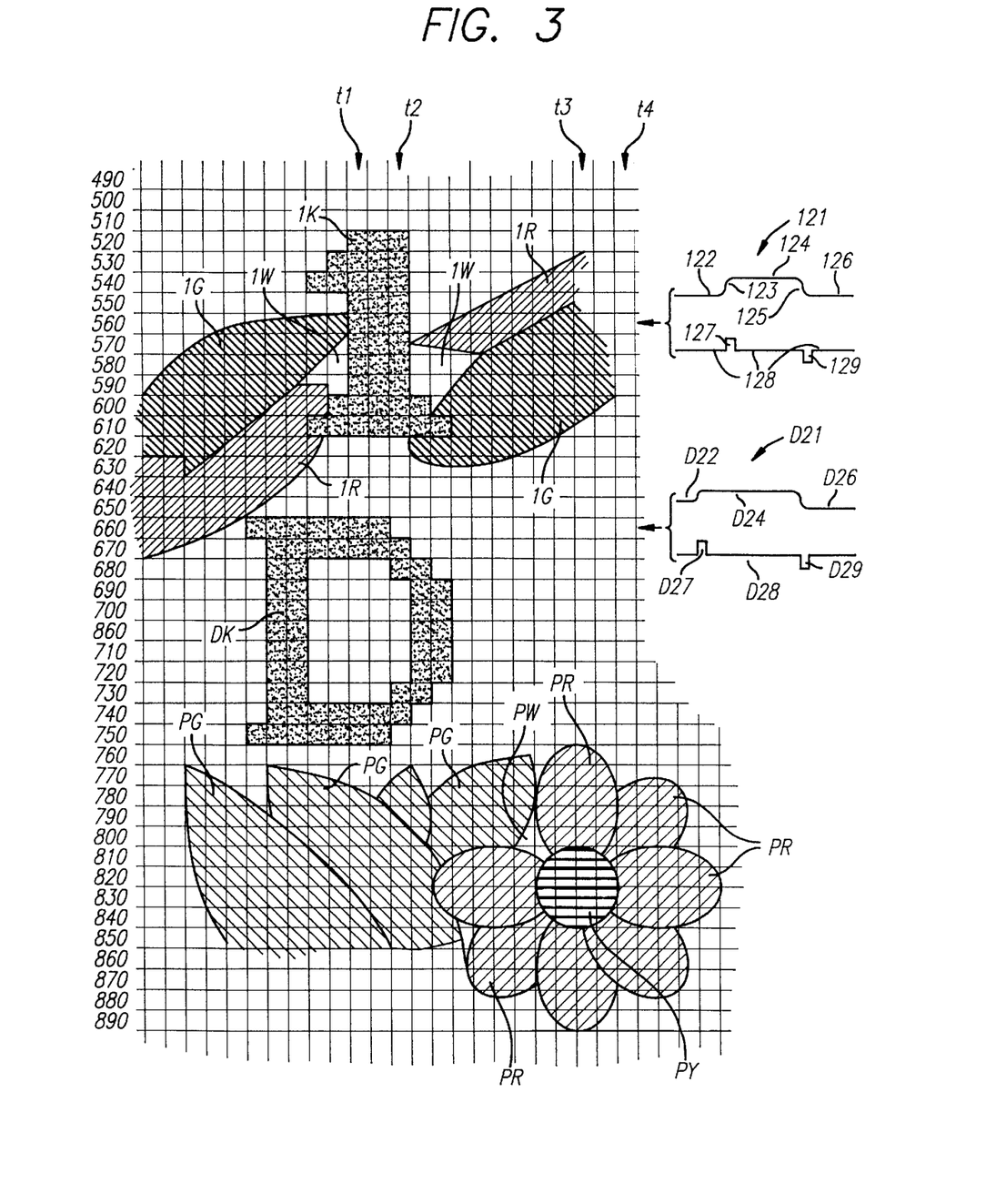
FIG. 3 is a diagram of portions of a representative image being read and analyzed by preferred embodiments of the present invention, together with associated waveforms resulting from interaction of the invention with those image portions.

Thus ideally the point of alignment is identified as a positive-going square-cornered peak 127, one pixel wide, in the convolution output signal 127–129 as a function of position along the pixel row. In practice, however, because the pixel structures of the scanner and original image (if indeed the latter was created by a pixel-based system) are in general not perfectly aligned, the peak 127 will extend over more than one scanner pixel width—and will not be square-cornered.

Similarly a peak 129 will occur if the vertical jump 31 is convolved with an edge waveform 125 that is negative-going (and again only at the moment, or position t2 along the pixel row, at which the two waveforms 125, 31 are aligned)—but in this case the peak 129 in the convolution 127–129, too, will be negative-going.

The actual numerical processes required to perform the convolutions are extremely simple and well documented, and can be implemented in firmware by a competent programmer without further explanation. They are also quite fast: if the window interval C (FIG. 2) is set to three at both sides of the central jump, all three convolutions can be done with only twelve additions and subtractions per pixel—four per chromatic primary (red, green and blue). Only a single row of buffering need be used.

For such purposes each plane of an image that has been scanned in may be taken as f(x), where x is pixel position along each row, and with values typically in the range from zero through two hundred fifty-five (i. e., assuming eight-bit processing). The vertical jump is taken as h(x)=−1 for x<0, and h(x)=+1 for x>0, given that |x|<C, and otherwise h(x)= 0—all just as shown in FIG. 2.

The convolution then is given as a sum—

$$\sum_{i=x-c}^{x+c} \underline{f}(i) \cdot \underline{h}(i), i \neq 0, -\underline{C}, +\underline{C}$$

which will be found to entail only addition and subtraction, no nontrivial arithmetic multiplication since |h| is everywhere either unity or zero. The convolution also will be found to require a number of such additions and subtractions equal to only 2C−2 for each plane—because no calculation at all is done where the jump function h is undefined, at 0, −C and +C.

This number of calculations, if C is set to three, is 2C−2=4 per plane, or for example twelve total, as mentioned earlier. The spacing C is subject to optimization for the types and sizes of text (and other features) that are anticipated, and therefore can be controlled indirectly in response to general operator settings if desired.

Figure 5:
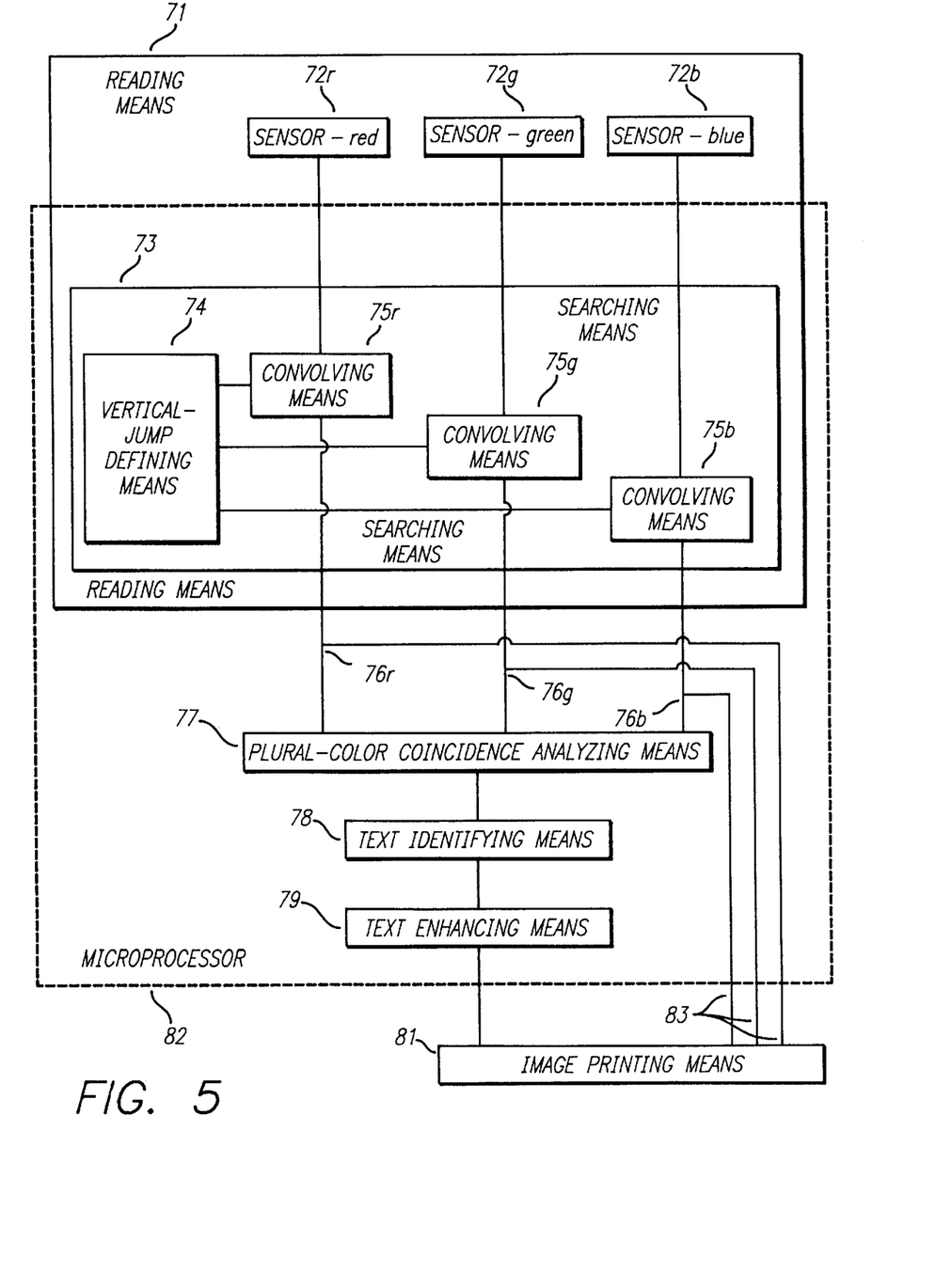
FIG. 5 is a block-diagrammatic representation of a hardware system according to the invention, and particularly showing the relationships between hardware and the terminology used in the above "SUMMARY" section of this document.

If preferred for greater speed of actually performing the convolutions, or to partially release a central system processor for other tasks, the procedures just described can be implemented in custom hardware—such as, for example, an application-specific integrated circuit. As will be appreciated by those skilled in the art, such implementation should be within the capability of a competent senior electronics designer. The waveforms 121, 127–129 at upper right in FIG. 3 may be taken as the response of a blue-sensitive photodetector 72b (FIG. 5) to the black numeral "1" which is represented by dense shading 1K at upper left in FIG. 3.

It is to be understood that FIG. 3 is somewhat schematic or conceptual. In actuality a text numeral in most practical fonts will be occupy at least perhaps five to ten times more pixel columns than suggested in the drawing—since modern pixel grids are typically very fine, namely some $\frac{1}{12}$ or $\frac{1}{24}$ millimeter ($\frac{1}{300}$ or $\frac{1}{600}$ inch) per step.

The vertical scale is somewhat more realistically labeled to suggest that each row of squares in the drawing represents ten pixel rows rather than one. In any event the drawing suffices for purposes of describing the invention.

Now when a scanner 72r/72g/72b (FIG. 5), after passing the blank pixel rows 490 through 510 (FIG. 3), reads 41 (FIG. 4) image rows 520, and when these latter rows are convoluted 43r/43g/43b (FIG. 4) within the searching means 73 (FIG. 5) with the windowed vertical jump 31 (FIG. 2), the response at pixel columns t1 through t2 (FIG. 3)—and just before and after those columns—is very much as indicated at right in FIG. 3 for rows 570. The same holds true at rows 550.

For the intermediate rows 530 and 540, the same statement still holds, except that the leading edge is farther to the left than at 123, so that the width of the plateau is greater than at 124. The resulting positive-going peak in the convolution is further to the left than 127, and correspondingly the central region of the convolution somewhat longer than the region between 127 and 128.

In all these cases, down through rows 560 inclusive, precisely the same responses are to be expected for a green-sensitive 72g (FIG. 5) or a red-sensitive detector 72r. Hence in these simple cases the first forty pixel rows of the black numeral "1" 1K are very easily recognized as black-on-white text by the coincidences detected 44 in the analyzing means 77 (FIG. 5) in the convolution-based edge-detection system described above.

The conditions that dark pixels be found between peak (e. g., 127) and trough (e. g., 129)—and light pixels between a trough and the next following peak (not shown in FIG. 3)—are likewise met. Inspection for satisfaction of the peak/trough, trough/peak conditions is readily performed 46, 47 (FIG. 4) during the process of reading in the image and doing the convolutions; and the required coincidence alternations too can be tested 45 in close association with the coincidence detection 44 itself.

Figure 4:
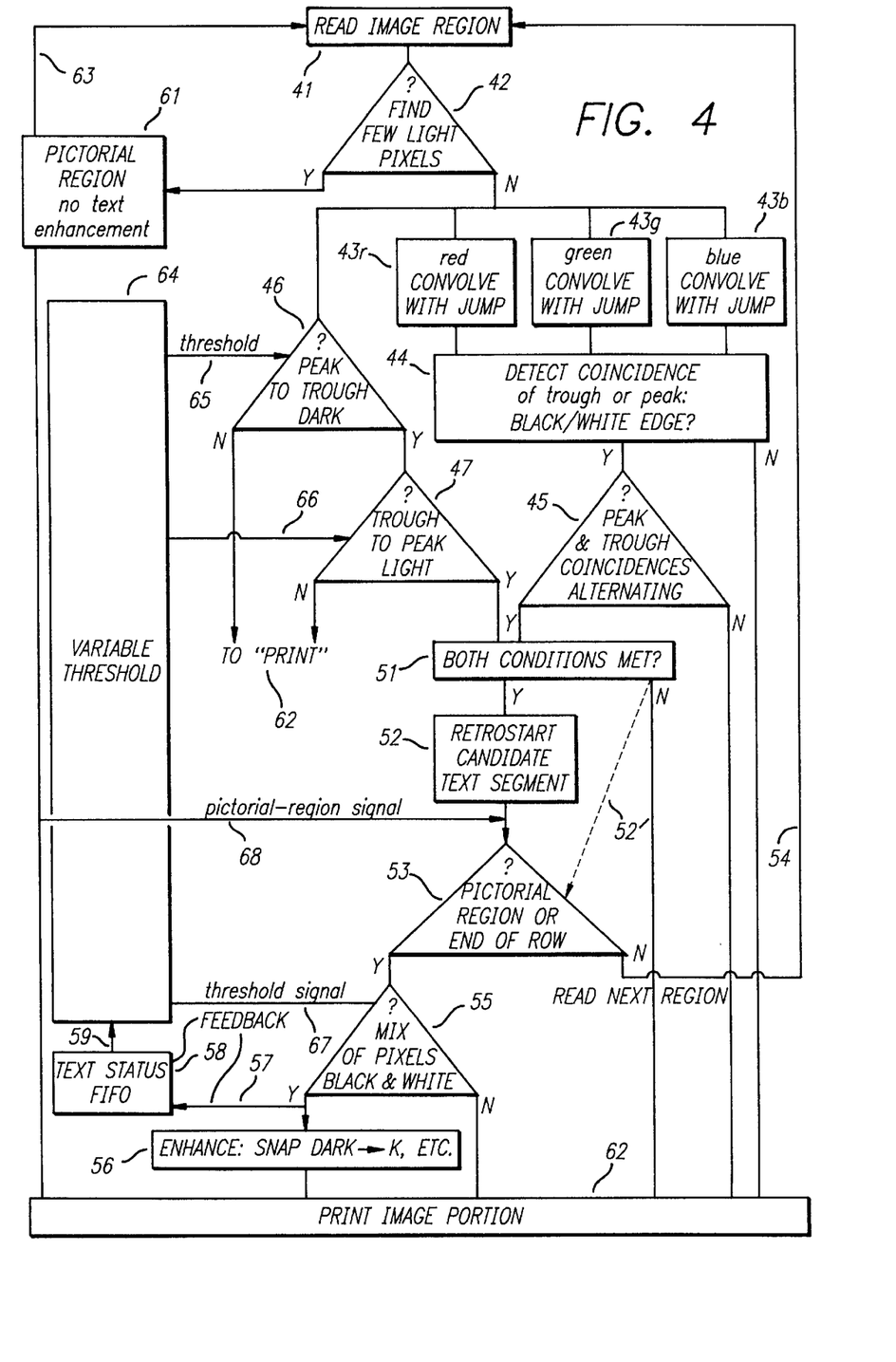
FIG. 4 is a flow chart showing operation of preferred embodiments of the invention—with the flow of logic running from top toward bottom and left toward right, except as indicated by upward and leftward arrows in feed-back path 57–59, 64–67, and recycle paths 54 and 63.

When the peak/trough, trough/peak tests 46, 47 and coincidence alternation test 45 are all found 51 to be satisfied, the system in effect declares 52 that a candidate text segment is being examined. This decision of course cannot be made until a trough or negative-going peak 129 is encountered—but is then made retroactive to the most recent positive-going peak.

The uppermost portion of the numeral 1K is also surrounded, or to be more precise bordered on three sides, by great numbers of white pixels—and so easily satisfies the pixel-mix condition too. Preferably, however, for reasonable efficiency in extending recognition of a relatively long run of text, this latter condition is not tested 55 until after the system has recognized 53 the end of a pixel row or the encountering 61 of a pictorial region (discussed later).

Thus after a candidate text segment is started 52 the system cycles back 54 to read more data, continuing to read and evaluate 42–51 those data until the end of a row is encountered or a pictorial region is encountered. Actually in cycling through additional data regions after a candidate text segment has been started, as will be appreciated the test at 51 works somewhat differently: now, encountering a coincidence failure does not invalidate the entire candidate text segment up to that point.

Rather the system first concludes processing of the candidate text by temporarily skipping 52' to the "end of row" test 53 (which here instead merely recognizes the end of the candidate text segment), then testing 55 for mix of pixels etc. as before, and printing 62 either with or without enhancement 56.

At this point, if the mix of pixels were found inadequate for recognition of text, the candidate text segment previously declared open 52 would be disqualified. For the top of the numeral 1K, however, the pixel-mix test 55 yields acceptable results.

Therefore the text identifying means 78 order the desired enhancement 56 to be performed by the text enhancing means 79. Next the enhanced image portion is directed to the printer 81 (FIG. 5) for printing 62.

After concluding that work with the previously open text segment, the system returns to the negative output line N from the both-conditions-met test 51, which line leads to printing 62 of the newly read region—without enhancement.

The searching means 73, coincidence analyzing means 77, text identifying means 78, and text enhancing means 79 may all be implemented as a part of a unitary integrated-circuit digital microprocessor 82. As mentioned earlier, however, the searching and coincidence analyzing means 73, 77 are alternatively implemented in custom hardware.

The same large numbers of white pixels, in the rows 520–540 under discussion, also meet the condition that the system is not examining a pictorial element. That fact is recognized 42 early-on by presence of more than just a very few light pixels.

Thus without qualification the system or procedures of the present invention recognize rows 520 through 550 as textual, and based on this recognition can readily proceed to enhance those rows by the enhancement protocol mentioned earlier.

If the black numeral 1K were the only feature in the representative image of FIG. 3, then the waveforms 121, 127–129 could be regarded as the response of a photodetector with any color sensitivity. In FIG. 3, however, additional green leafy shapes 1G and analogous red shapes 1R are assumed to be closely associated with the central and lower portions of the numeral 1K, as at pixel rows 560 through 620.

Thus a waveform showing response of a green-sensitive detector at pixel rows 560 would have a considerably broader plateau, incorporating the detector response to one of the "leaves" 1G which touches the left side of the numeral 1K. Such a waveform would also include another, separated plateau representing response to another one of the leaves 1G which is drawn spaced away from the right side of the numeral 1K.

These responses, however, would be very low or zero in the regions of the red shapes 1R; therefore the green-sensitive detector would register solid color to only one side, not both, of the numeral 1K. Similarly a red-sensitive detector would produce a waveform with an additional, separate plateau to the right representing the upper-right red shape 1R, and a conjoined broader plateau toward lower-left representing the lower-left red shape 1R.

As drawn, these shapes thus preclude coincidence of detected edges at rows 560 and 600 on the left side of the numeral 1K, and at rows 600 and 610 at both sides. Therefore the coincidence detection 44 (FIG. 4) fails (and with it necessarily the peak-to-trough and trough-to-peak tests 46, 47).

Accordingly from the negative N output line of the coincidence test 44 a path is followed directly to the print function 62. In other words the system cannot enhance these particular portions of the text element 1K, and the printer 81 (FIG. 5) prints them without enhancement. Generally speaking, as FIG. 4 shows, a negative result at any one of the major tests 44–47, 51, 55 results in a similar program flow to the printing function 62—bypassing text enhancement 56.

At all or part of rows 570 through 590, however, white spaces 1W included very near the black numeral 1K enable the system to find the necessary edge coincidences—and also to pass the tests 45, 46–47, 42 for (1) black-and-white pixel mix, (2) dark pixels between peak and trough, and (3) absence of a pictorial element. With respect to at least the first of these latter three tests—and one or more of the others as well, if desired—as can be seen the number of light pixels is relatively very small.

The system surmounts this challenge, however, by virtue of applying the historically controlled sliding-scale threshold mentioned previously. Because text was recognized 55 previously (though not immediately preceding) at rows 520 through 550, the system here uses—as the number of light pixels required for satisfaction of the test or tests—a relatively very low threshold.

To accomplish this, the same mix-of-pixels test 55 in addition to commanding enhancement 56 also sends a status feedback signal 57 to a small buffer memory 58. This first-in/first-out buffer, in turn, directs a delayed threshold-control status feedback signal 59 to a variable threshold control block 64.

This block in turn feeds back different threshold signals 67 to the mix-of-pixels test 55—and if desired even further back up to the peak/trough, trough/peak tests 46, 47 too, as shown at 66, 65. If desired, variable thresholding may also be applied to the few-light-pixels test 42 shown near the top of FIG. 4. (Another variant within the scope of my invention is to modify the definitions of pixel darkness/lightness used for the various thresholds—instead of, or in addition to, modifying the pixel counts.)

The number of light pixels found at rows 570–590, while small, is well above zero and exceeds the low test threshold imposed by the feedback loop 57–59, 64–67. In these regions the system therefore can correctly identify the textual element 1K, and can proceed to enhance it.

If there were only just a very thin white border at both left and right of the character 1K, the variable threshold technique would enable the invention to recognize and enhance the numeral 1K in rows 560/600–610 too. As a practical matter, the visual system of a person viewing the finished drawing tends to integrate the enhancement effects over such relatively very small gaps where the character is printed in at least gray but not actively enhanced.

Nevertheless, it is possible to implement broad aspects of my invention in such a way as to minimize occurrences of text nonrecognition in situations such as rows 560, and rows 600 through 610. For example, my invention can be practiced to define and find "text" as regions of coincidence for any two of the three color planes, rather than requiring all three.

Yet another variant is to enable such finding of "text" for coincident edges in any two planes only in cases of reduced threshold, just as described above for pixel darkness or pixel count. Thus for instance the system may be programmed to recognize "text" upon finding of coincident edges in any two planes, if text was found in recent (even though not immediately preceding) pixel rows; and even to recognize "text" upon finding of coincident edges in just one plane, e. g. where aligned text was found immediately preceding.

Still other variants include specifying particular color planes for use in these various circumstances. For example, a decision might be made to rely upon edges found only in signals from a green-sensitive detector.

Contrariwise, there is some basis for a converse rule: edges found only in signals from a red-sensitive detector may be deemed to represent an image region where black text without enhancement is particularly difficult to visually distinguish in appearance from adjoining color materials.

Thus black may be readily visible next to blue or green, since the eye is relatively sensitive to those colors. Under this philosophy there may be minimal need for enhancement in such regions.

Edges found only in signals from a red-sensitive detector, however, may be deemed to represent a region that is particularly needful of enhancement—for here only indistinct borders otherwise appear to the human eye, which is relatively insensitive to red.

In any event, as can now be appreciated a number of varying implementations of the invention are practical and readily accomplished. These are considered within the scope of certain of the appended claims.

Another black character, an alphabetic letter "D", is seen in dense shading DK at rows 660 through 750, spaced downward from the numeral 1K in the drawing. At right are the resulting waveforms D21, D27–D29, with features identified by callouts having the prefix "D" instead of "1"; the remainder of each callout is the same as for the corresponding callout in the waveforms above for the character 1K.

The waveform features here include an image signal waveform D21, with a broader plateau D24 arising from the broader top stroke of the character DK, and corresponding convolution waveform D27–D29 with its broader intermediate zero segment D28.

Some of the red shapes 1R—associated with the numeral 1K—extend downward from that numeral and into the leftward portion of the vertical space between the bottom of the numeral 1K and the top of the character DK. (These are not manifested in the waveforms D21, D27–D29 from the blue-sensitive detector.)

These nearby red shapes 1R tend against recognition of the top of the letter DK at row 660. Furthermore row 660 is now relatively remote from the last incidence of text that was actually recognized, namely at row 590; therefore the variable threshold, too, will tend against recognition of the top of the letter.

Nevertheless the black "D" letter DK should be readily recognized by virtue of the ample number of nearby white pixels and the cleanly isolated edges in all three planes. Therefore this character too is identified as text and accordingly printed with enhancement.

An example of an opposite kind of image material appears at rows 770 and following. Here the floral shapes PG, PR, PB in green, red and blue clearly constitute—for the human eye—pictorial regions.

The present invention, too, will recognize them as such, based upon the absence of light-colored pixels starting at row 780 and continuing through rows 800. The relatively small incursion of white pixels PW in row 810, being considerably smaller than a textual feature (as seen in characters 1K, DK above), would not likely result in recognition of a black feature as "text" even if a black detail were present in the region.

Preferably the invention performs this simple, quick very-few-light-pixels test 42 before starting into the several more-elaborate steps 43–61 discussed above. This sequence has an important advantage.

A positive result of this test 42 means a positive result as to presence of pictorial elements, and therefore in effect a negative finding as to the presence of text. This finding is passed along the positive output line Y from the few-light-pixels test 42 to a decision 61 that there should be no text enhancement.

From this decision block 61 are issued two commands, as shown: one straight down to the print function 62, and the other line 63 directly back up to the read-image function 41. In this way the option of text enhancement is preserved without wasting much processing time in clearly adverse situations. In other words, pictorial-region determination overrides text enhancement, and leads to omission of all the testing associated with text enhancement.

Classification of a region as pictorial is passed down to corresponding pixels of subsequent rows—until there are more light pixels. Pictorial-region classification tends to limit the overall processing to enhancing black text on a white region; but this limitation need not be rigid, and as suggested earlier the invention is amenable to variation and optimization of conditions for different types of images or different desired results.

In particular the invention straightforwardly manages black text on different types of printing media, because the parameters used in the algorithms may be made variable rather than constant. These variables are functions of the lightness/darkness of the printing medium.

Preferably in practice of this invention an additional step is performed to tie together adjoining textual regions—that is, pixel sequences that meet all the conditions through the pixel-mix test 55. If the regions between textual regions again have the right mix of pixels, then the two textual regions are made into one.

This step obviates the need to detect top and bottom edges—time consuming due to required buffering. For instance, the top of a letter "T" often consists entirely of pixels that are intermediate between dark and light—denying the system well-defined edges at either side.

Such a top edge does not belong to a textual region, as determined by previously described forms of the invention. By tying adjoining textual components together, the top edge of the "T" and other like textual components are made parts of textual regions and so can be enhanced.

Discussion of the invention in much of this document refers to colors generally—resolution of a scanned-in image into three colors, coincidence of all three colors in a three-color system, or of plural colors or a single color, etc. Most commercial scanner systems, however, now operate on the basis of separate subsystems for detecting red, green, and blue (RGB) light from an image to be scanned.

The invention is very straightforwardly practiced in this form. Therefore, solely for the sake of definiteness and relative simplicity of the disclosure, the foregoing "DETAILED DESCRIPTION" passages explicitly refer to resolution, coincidence etc. in RGB terms.

The invention, however, is not in the slightest limited to RGB implementations. To the contrary, the invention is entirely amenable to operation in other plural-chromatic-color coordinate systems, whether or not the color system used for initial scanning operations is RGB.

Practice of the invention is also particularly straightforward upon conversion of scanned-in color inputs into color-coordinate systems in which the nonchromatic component is a separate dimension, separately managed. Such systems include for example the hue-plus-gray (HPG) or hnk system, and the better-known LAB systems.

With color specified in any of these ways, it is necessary to test for left and right edges in only the nonchromatic constituent—namely, k (in HPG) or L (in LAB or the like) alone. For certain forms of the invention as discussed above this mode of implementation may be substantially more convenient or efficient.

The above disclosure is intended as merely exemplary, and not to limit the scope of the invention—which, rather, is to be determined by reference to the appended claims.

What is claimed is:

1. A method for enhancing and printing text in an image having multiple regions comprising:
   resolving the image into a plurality of colors;
   detecting left and right edges for each individual color in said plurality of colors;
   identifying as "text" only those regions of the image where detected left and right edges are found in coincidence;
   enhancing the image in the regions identified as text; and
   printing the enhanced image.

2. The method of claim 1, for use with a color image and wherein:
   further comprising the step of analyzing the resolved image to locate regions having mostly white and black; and
   wherein the identifying step comprises identifying as text only (1) said located regions having mostly white and black, in conjunction with (2) said found left and right edges.

3. The method of claim 2, further comprising:
   testing portions of the resolved image to determine whether each tested portion contains pictorial elements; and
   eliminating said analyzing and identifying step if a particular tested portion contains pictorial elements.

4. The method of claim 3, wherein the testing step comprises:
   examining each portion to verify that it has very few light pixels; and
   identifying "a portion that contains pictorial elements" as a portion that has very few light pixels.

5. The method of claim 1, wherein said enhancing step comprises:
   adjusting to pure black all dark "text" parts;
   making no change in all light "text" parts; and
   adjusting to pure white all "text" parts intermediate between dark and light.

6. A method for enhancing and printing text in an image having multiple regions according to claim 1, further comprising:
   testing portions of the resolved image to determine whether each tested portion contains pictorial elements; and
   eliminating the step identifying if a particular tested portion contains pictorial elements.

7. The method of claim 6, wherein the testing step comprises:
   examining each portion to verify that it has very few light pixels; and
   identifying "a portion that contains pictorial elements" as a portion that has very few light pixels.

8. A method for enhancing and printing text in a color image having multiple regions; said method comprising the steps of:
   reading the image;
   analyzing the read image to find left and right edges;
   analyzing the read image to locate regions having mostly white and black by resolving the image into a multiplicity of pixel rows and, for each pixel row after a first pixel row, by applying a threshold, for what constitutes mostly white and black, which is a progressively higher threshold when there are progressively greater numbers of pixel rows since the last preceding identified "text";
   identifying as "text" only certain regions of the image which contain, in coincidence, both (1) said found left and right edges and (2) said located regions having mostly white and black;
   enhancing the image in the regions identified as text; and
   printing the enhanced image.

9. The method of claim 8, for use with a color image and wherein:
   the reading step comprises the substeps of first resolving the image into a plurality of colors, and searching each color of the image to detect left and right edges in that color; and
   the analyzing step comprises finding as left and right edges only regions where left and right edges are detected in plural colors in coincidence.

10. The method of claim 9, wherein:
    the searching substep comprises the step of convolving each color of the image with a test function.

11. The method of claim 10, wherein:
    the test function comprises a vertical jump.

12. The method of claim 10, wherein:
    the test function comprises a vertical jump of a certain height, spaced between two other vertical jumps of lesser height and opposite direction to the first-mentioned vertical jump.

13. The method of claim 12, wherein:
    the image-reading step comprises resolving the image into a multiplicity of pixels; and
    the two smaller vertical jumps are spaced respectively three pixels to left and right of the first-mentioned vertical jump.

14. The method of claim 10:
    further comprising the step of analyzing the read image to locate regions having mostly white and black; and
    wherein the identifying step comprises identifying as "text" only (1) said located regions of the image having mostly white and black, in coincidence with (2) said found left and right edges.

15. The method of claim 14:
    wherein the convolving step produces a convolution that has peaks followed by troughs; and
    further comprising the step of analyzing the read image to select regions having primarily black between peak and trough, and primarily white between trough and peak; and
    the identifying step comprises identifying as "text" only (1) said selected regions having primarily black between peak and trough, and primarily white between trough and peak, in coincidence with (2) said found left and right edges and (3) said located mostly white and black regions.

16. The method of claim 8, further comprising:

testing portions of the read image to determine whether each tested portion contains pictorial elements; and if a particular tested portion contains pictorial elements, then omitting or discounting the analyzing and identifying steps.

17. The method of claim 16, wherein the testing step comprises:

examining each portion to verify that it has very few light pixels; and identifying "a portion that contains pictorial elements" as a portion that has very few light pixels.

18. The method of claim 8, wherein said enhancing step comprises:

adjusting to pure black all dark "text" parts; and adjusting to pure white all "text" parts intermediate between dark and light.

19. A system for enhancing and printing text in an image having multiple regions, said system comprising:

means for reading the image;

means for analyzing the read image to find left and right edges;

means for identifying as "text" only certain regions of the image where left and right edges are found in conjunction;

means for enhancing the image in the regions identified as text;

means for printing the enhanced image; and wherein the reading means comprise means for first resolving the image into a plurality of colors, and means for searching each color of the image to detect left and right edges in that color; and the analyzing means comprise means for finding as left and right edges only regions where left and right edges are detected in plural colors in coincidence.

20. The system of claim 19, wherein:

the searching means comprise means for convolving each color of the image with a test function.

21. The system of claim 20, wherein:

the searching means comprise means for defining the test function as comprising a vertical jump.

22. the system of claim 20, wherein:

the searching means comprise means for defining the test function as comprising a vertical jump of a certain height, space between two other vertical jumps of lesser height and opposite direction to the first-mentioned vertical jump.

23. A system for enhancing and printing text in an image having multiple regions comprising:

means for resolving the image into a plurality of colors;

means for detecting left and right edges for each individual color in said plurality of colors;

means for identifying as "text" only those regions of the image where detected left and right edges are found in coincidence;

means for enhancing the image in the regions identified as text; and means for printing the enhanced image.

* * * * *